US007097676B2

(12) United States Patent
Wootan et al.

(10) Patent No.: US 7,097,676 B2
(45) Date of Patent: Aug. 29, 2006

(54) PROCESS AND DEVICE FOR PRODUCING HYDROGEN

(76) Inventors: Norman Wootan, RR2 Box 581, Hubbard, TX (US) 76648; Kenneth Hawkins, 3342 Cadbury St., San Antonio, TX (US) 78247

( * ) Notice: Subject to any disclaimer, the term of this patent is extended or adjusted under 35 U.S.C. 154(b) by 71 days.

(21) Appl. No.: 11/005,537

(22) Filed: Dec. 6, 2004

(65) Prior Publication Data

US 2005/0150164 A1     Jul. 14, 2005

Related U.S. Application Data

(62) Division of application No. 10/179,475, filed on Jun. 25, 2002.

(30) Foreign Application Priority Data

Jun. 26, 2001    (EP)    .................................    01250239

(51) Int. Cl.
    *C10J 3/00*    (2006.01)
(52) U.S. Cl. ............................. 48/210; 48/61; 48/62 R; 48/101; 48/93; 48/94; 48/95; 48/211; 48/212; 48/213; 48/214 R; 48/215; 422/186; 422/186.01; 422/186.04
(58) Field of Classification Search .................... 48/61, 48/62 R, 101, 93–95, 210–213, 214 R, 215; 422/186, 186.01, 186.04
    See application file for complete search history.

(56) References Cited

U.S. PATENT DOCUMENTS

| 4,469,508 A | 9/1984 | Cavadis et al. |
| 4,976,940 A | 12/1990 | Paulson |
| 5,560,890 A | 10/1996 | Berman et al. |
| 5,861,600 A | 1/1999 | Jensen |

FOREIGN PATENT DOCUMENTS

| FR | 2 578 263 A | 9/1986 |
| JP | 57038304 A | 3/1982 |
| JP | 04103691 A | 1/1992 |
| JP | 10251001 A | 12/1998 |
| WO | WO8002150 A | 10/1980 |

*Primary Examiner*—Glenn Caldarola
*Assistant Examiner*—Vinit H. Patel

(57) ABSTRACT

A process and a device are provided for producing hydrogen gas from water and carbon. The process includes introducing steam and powdered carbon in stoichiometric ratio of carbon to water into a preheated oxidization chamber in such a way that a gas plasma is produced in which the steam is decomposed into its hydrogen and oxygen gas components and oxygen is combined with carbon to form carbon dioxide gas in an exothermic reaction at temperatures above 2000° C., and separating the carbon dioxide gas from the hydrogen gas. The device for conducting this process has an oxidization chamber defined in a hollow body and being provided with a preheater and having at least one inlet port for introducing steam into the oxidization chamber, at least one inlet port for introducing powdered carbon into the oxidization chamber, and at least one exit port for carrying off generated hydrogen gas and/or generated carbon dioxide gas from the oxidization chamber.

5 Claims, 5 Drawing Sheets

PROCESS AND DEVICE FOR PRODUCING HYDROGEN

CROSS REFERENCE TO RELATED APPLICATIONS

Applicants claim priority under 35 U.S.C. §119 of European Patent Application No. 01 250 239.9, filed on Jun. 26, 2001. This Patent application is a division of and Applicants claim priority under 35 U.S.C. 120 and 35 U.S.C. 121 of U.S. patent application Ser. No. 10/179,475 filed Jun. 25, 2002.

BACKGROUND OF THE INVENTION

1. Field of the Invention

The present invention relates to a process and a device for producing hydrogen gas from water and carbon.

2. Description of the Related Art

There is a constant quest for new sources of energy that are ecologically clean and economical to produce. Since carbon and water are two of the most abundant substances on earth it would be highly appreciated if one could directly combine them in a very efficient process in order to produce pure hydrogen gas and carbon dioxide gas.

Prior to the turn of the century many cities in the United States of America and in Europe produced a form of illuminating gas called water gas which was generated during the day, stored in large floating storage tanks and burned at night in the gas street light system of the city. The water gas generators used simple principals of operation that can be found in many books relating to technical processes. Basically the apparatus used for producing said gas was a closed retort chamber that incorporated a bed of air blown incandescent coke. The air was turned off and the bed of white-hot coke was blown with live steam. Since the threshold of dissociation vapour state water is around 1100° C. the water partially split allowing the oxygen to combine with the carbon to form carbon monoxide leaving the hydrogen gas in the free state. Hydrogen and carbon-monoxide are both combustibles when mixed with air so after a scrubbing state to remove ash a form of illuminating gas was produced and stored for later use.

A person skilled in the art will agree that the above process for producing the illuminating gas is endothermic by the fact that the bed of coke can only be blown with live steam for a short period of time during which the white-hot coke is cooled. At this point air has to be re-admitted to bring the coke back to an incandescent state to provide the threshold dissociation temperatures needed.

SUMMARY OF THE INVENTION

The object of the present invention is to provide a process and a device of the type referred to in the preamble, with which pure hydrogen gas can be produced economically.

With regard to the process this object is achieved according to the invention by a process comprising: introducing steam and powdered carbon in stoichiometric ratio of carbon to water into a preheated oxidization chamber in such a way that a gas plasma is produced in which the steam is decomposed into its hydrogen and oxygen gas components and oxygen is combined with carbon to form carbon dioxide gas in an exothermic reaction at temperatures above 2000° C., and separating the carbon dioxide gas from the hydrogen gas.

According to a preferred embodiment of the invention the preheating of the oxidization chamber is carried out by introducing a fuel gas into the oxidization chamber. The fuel gas may consist of natural gas or propane.

According to another preferred embodiment of the invention the gas plasma is present in the form of an implosion vortex having a high spin rate. The implosion-vortex causes a separation of the generated hydrogen gas from other gas components and/or carbon particles due to the different molecular weight of hydrogen with respect to carbon, carbon monoxide and carbon dioxide.

Preferably, the process according to the invention comprises a recirculation of partially oxidized carbon particles and/or carbon monoxide gas into the gas plasma. This recirculation improves the efficiency of the process.

A further advantageous embodiment of the process according to the invention is provided by utilization of an electrostatic arc across the spinning gas plasma in order to fill valence electrons into the gas plasma constituents. In this way impurities will condense out in pure state and will not contaminate the hydrogen production process.

According to a further advantageous embodiment of the invention the generated hydrogen gas is cooled in a heat exchanger. The heat carried off in the heat exchanger can be utilized to preheat water which is transformed into steam. The heat carried off can also be used to provide external heating of a facility or a hot water storage unit. Furthermore, the heat carried off can also be used to thermally charge zeolite energy storage modules.

A further advantageous embodiment of the invention is provided in that the generated hydrogen gas is treated with magnetic fields to spin synchronize and stabilize as the hydrogen gas is cooled. In this way monatomic hydrogen gas can be produced, since normal cooling of the output hydrogen gas will result in the hydrogen assuming its natural state of molecular hydrogen ($H_2$).

With regard to the device, the above-mentioned object is achieved according to the invention by a device comprising an oxidization chamber defined in a hollow body made of a material withstanding temperatures above 2000° C., said oxidization chamber being provided with means for preheating the oxidization chamber and having at least one inlet port for introducing steam into the oxidization chamber, at least one inlet port for introducing powdered carbon into the oxidization chamber, and at least one exit port for carrying off generated hydrogen gas and/or generated carbon dioxide gas from the oxidization chamber.

The device according to the invention allows the production of pure hydrogen gas in economical way. It has no moving parts and can be manufactured in a very compact form.

Preferably, the hollow body defining the oxidization chamber is composed of a high densified ceramic construction cast in a single monolithic unit or in several sections that are fused together into a monolithic unit.

The means for preheating the oxidization chamber may consist of at least one inlet port for introducing air and fuel and of means for igniting an air-fuel mixture.

A preferred embodiment of the device according to the invention is characterized in that the at least one inlet port for introducing steam into the oxidization chamber is provided with an omni nozzle (annular nozzle) and a vortex generator.

According to a further advantageous embodiment of the device according to the invention a steam generating chamber is arranged around the oxidization chamber. Preferably, the steam generating chamber is arranged concentrically with respect to the oxidization chamber. This concentric design places the steam generating chamber in the most advantageous location to provide the dissociation of vapour state water.

Other objects and advantageous embodiments of the process according to the present invention and of the corresponding device will become apparent from a reading of the following detailed description and the appended claims.

BRIEF DESCRIPTION OF THE DRAWINGS

The invention is described hereinafter in more detail on the basis of schematic drawings representing a preferred embodiment.

In the drawings

DESCRIPTION OF A PREFERRED EMBODIMENT

Figure 1:
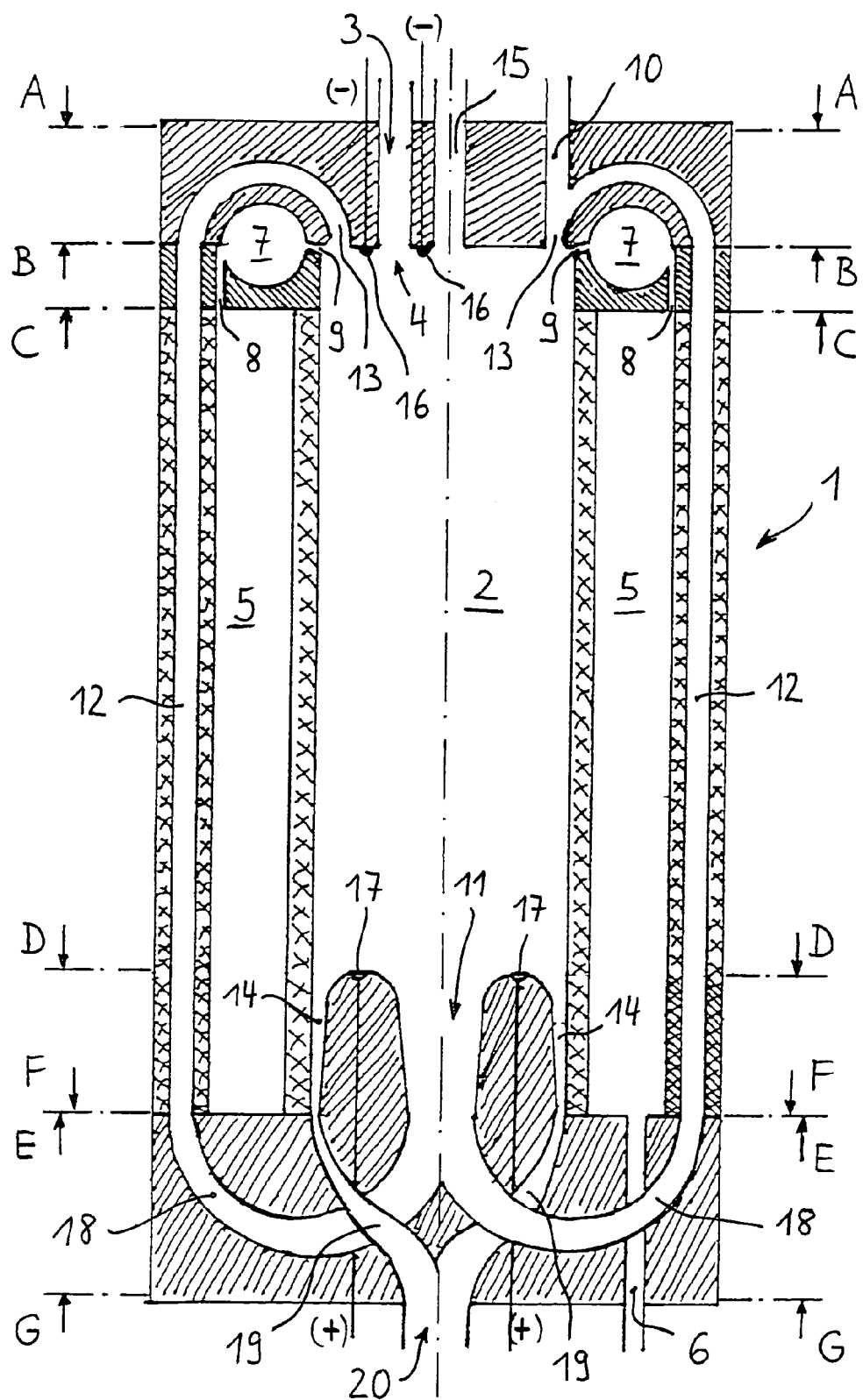
FIG. 1 is an overview illustration of a device according to the invention in a longitudinal section view.

FIG. 1 is an overview illustration of a device for producing hydrogen gas from water and carbon. In this embodiment the entire device will be composed of a high densified ceramic construction cast in several sections that are fused into a monolithic unit which is durable under the ultra high temperature conditions during the operation of the device. The densified ceramic withstands a temperature above 2000° C., preferably a temperature above 3000° C. and in particular a temperature of about 4400° C.

The device consists of a cylindrical hollow body 1 having a cylindrical main oxidization chamber 2. An inlet is provided at 3 for the introduction of a starting air-fuel mixture into the oxidization chamber 2. The fuel may be natural gas or propane. The air-fuel mixture is used to bring the device up to a self-sustaining, exothermic region of operation. Thus, the device according to the invention is primed by the air-fuel mixture. An electric ignition of the air-fuel mixture is accomplished via a spark gap at 4. The combustion of the air-fuel mixture takes place within the oxidization chamber 2.

After a sufficient temperature is reached prefiltered water is introduced into a steam generating chamber 5 via an inlet port 6. The steam generating chamber 5 is arranged concentrically at the outer periphery of to the cylindrical oxidization chamber 2. The generated steam having high pressure enters a vortex generator 7 via tangential inlets 8. The vortex generator 7 consists of an annular space having a circular cross-section.

The steam having a high spin rate exits the vortex generator 7 via an omni nozzle port 9 (annular nozzle port). The omni nozzle port 9 is arranged adjacent the upper end of the oxidization chamber 2 shown in FIG. 1. Due to the reduced radius of rotation the steam is accelerated to an ultra high spin rate within the oxidization chamber 2. After a threshold steam decomposition temperature is reached, which is above 1100° C., fine particle carbon is introduced into the oxidization chamber 2 at injection port 10. The powdered carbon is introduced in stoichiometric ratio with respect to the water contained in the steam introduced into the oxidization chamber 2 via omni nozzle port 9. Within the oxidization chamber 2 the steam and the powdered carbon produce an implosion vortex gas plasma in which the steam is decomposed in an exothermic reaction at temperatures between 2000° C. and 4500° C. into its hydrogen and oxygen gas components and oxygen is combined with carbon to form carbon dioxide gas.

An annular section of the hollow body 1 protruding into the cylindrical oxidization chamber 2 at the lower end thereof forms a port of a recirculation path 12 for unoxidized carbon particles and carbon monoxide to be reintroduced into the oxidization chamber 2 via a port 13 arranged at the upper end of the oxidization chamber 2. The recirculation path 12 is arranged concentrically to the oxidization chamber 2 at the outer periphery of the steam generating chamber 5.

Due to the design of the omni nozzle 9 in relation to the main oxidization chamber 2 at the recirculation port 13 a low-pressure region is generated which provides a suction effect that powers the recirculation of unoxidized carbon particles and carbon monoxide gas and the carbon particle input to the oxidization chamber 2.

The physics behind an implosion vortex such as employed in the process according to the invention will provide separation of light gases from heavy gases and particulate matter. In an implosion vortex, heavy gases and particulate will always go to the core of the vortex with the lightest gases separated to the outer regions of the vortex. An outlet annular port, which is concentric with the recirculation port 11, is provided at 14 for the exit of light hydrogen gas from the oxidization chamber 2. Mass separation of dissimilar gases within the implosion vortex allows the cooler carbon dioxide gas to exit the implosion vortex via port 15. Both, the carbon dioxide gas exit port 15 and the recirculation port 11 are arranged at the centre line of the cylindrical oxidization chamber 2.

In FIG. 1 reference numbers 16, 17 depict electrodes. The anode consists of a tungsten ring 17, which is arranged between the hydrogen exit port 14 and the recirculation port 11, while the cathode consists of two knob like electrodes 16 arranged adjacent the air-fuel mixture inlet port 3. The electrodes serve to ignite the air-fuel mixture. Moreover, the electrodes serve to produce an electrostatic arc across the spinning gas plasma in the oxidization chamber 2 from the electrodes 16 to the tungsten ring 17. The utilization of this electrostatic arc is for the purpose of filling valence electrons in the plasma gas constituents so that impurities will condense out in pure state and not contaminate the hydrogen production process.

Figure 2:
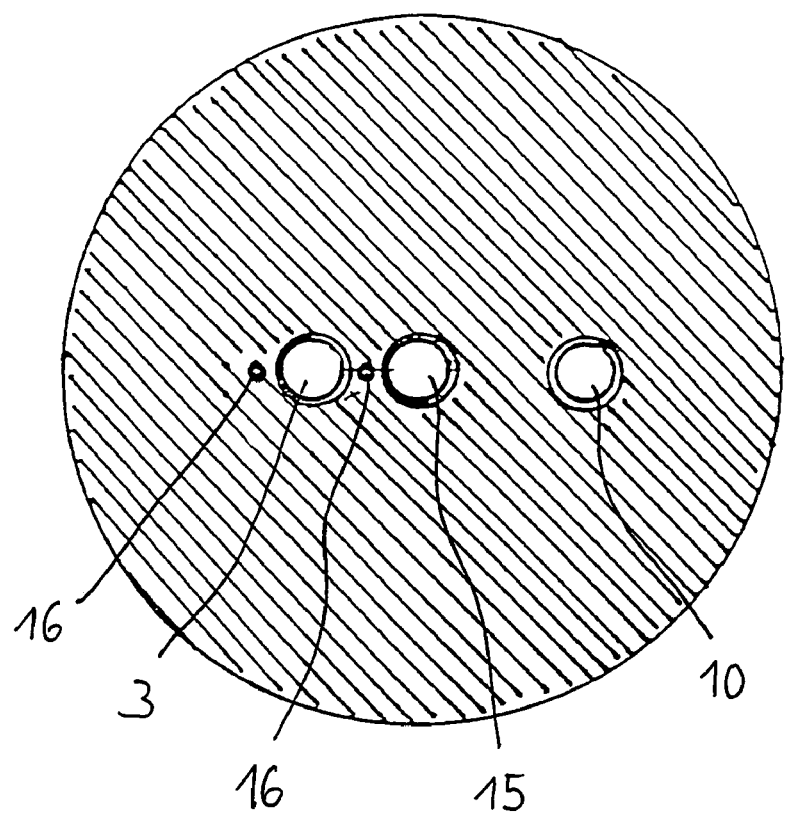
FIG. 2 is a cross-sectional view of the device of FIG. 1 along line A—A.

FIG. 2 depicts the carbon inlet port 10, the carbon dioxide exit port 15, the fuel-air mixture inlet 3 and the electrodes 16.

Figure 3:
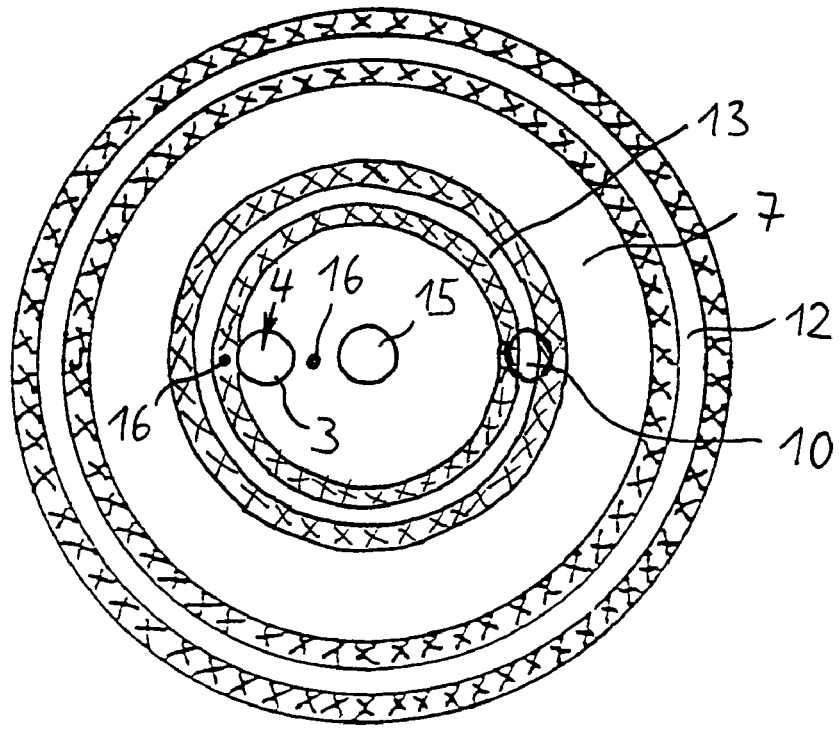
FIG. 3 is a cross-sectional view of the device of FIG. 1 along line B—B.

FIG. 3 depicts the recirculation path 12, the steam vortex generator 7, the carbon inlet port 10, the recirculation port. 13, the carbon dioxide exit port 15, the fuel-air mixture inlet port 3 and the ignition spark gap 4 defined by the electrodes 16.

Figure 4:
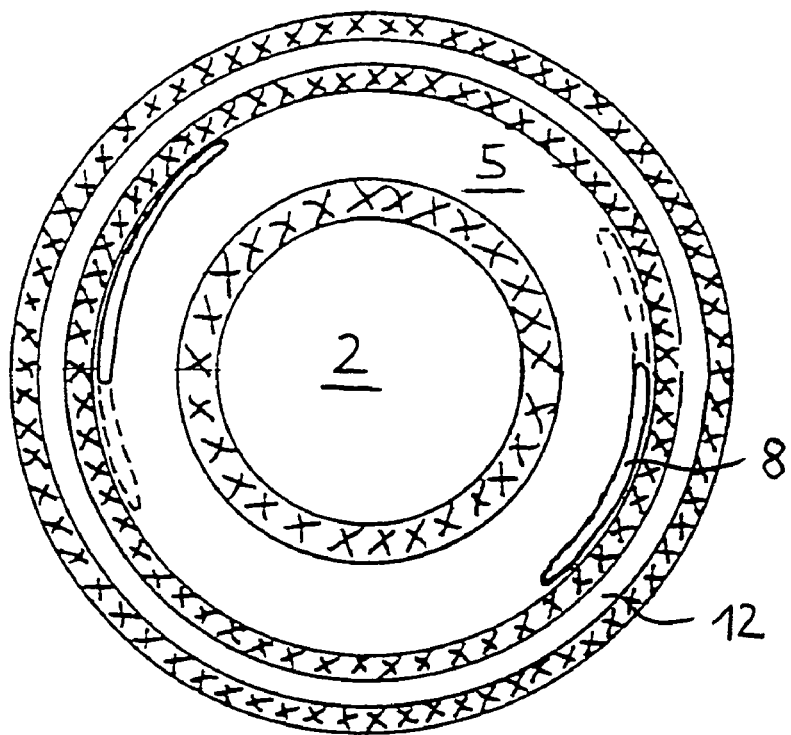
FIG. 4 is a cross-sectional view of the device of FIG. 1 along line C—C.

FIG. 4 depicts the recirculation path 12, the steam generating chamber 5, the tangential steam injection ports 8 and the main oxidization chamber 2. The tangential steam injection ports 8 define curved slots which are inclined between the steam generating chamber 5 and the annular vortex generator 7. This inclined arrangement supports the vortex generation within the annular vortex generator 7.

Figure 5:
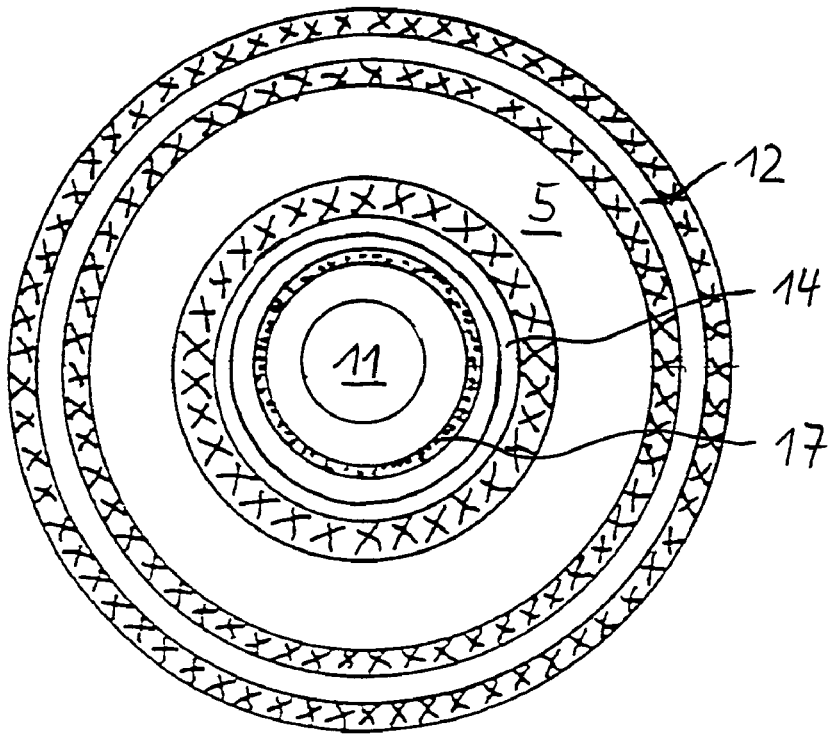
FIG. 5 is a cross-sectional view of the device of FIG. 1 along line D—D.

FIG. 5 depicts the carbon particle and carbon monoxide recirculation port 11, the tungsten ring 17, the annular hydrogen gas exit port 14, the steam generating chamber 5 and the recirculation path 12. The annular hydrogen gas exit port 14 is arranged concentrically with respect to the carbon particle and carbon monoxide recirculation port Ii.

Figure 6:
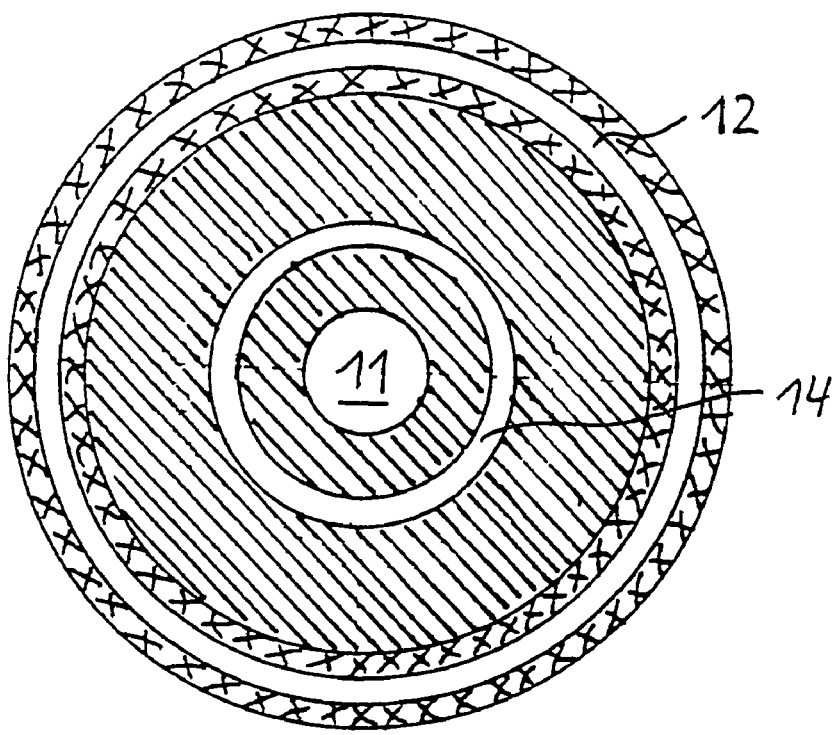
FIG. 6 is a cross-sectional view of the device of FIG. 1 along line E—E.

FIG. 6 depicts the recirculation path 12, the annular hydrogen gas exit port 14 and the recirculation exit port 11.

Figure 7:
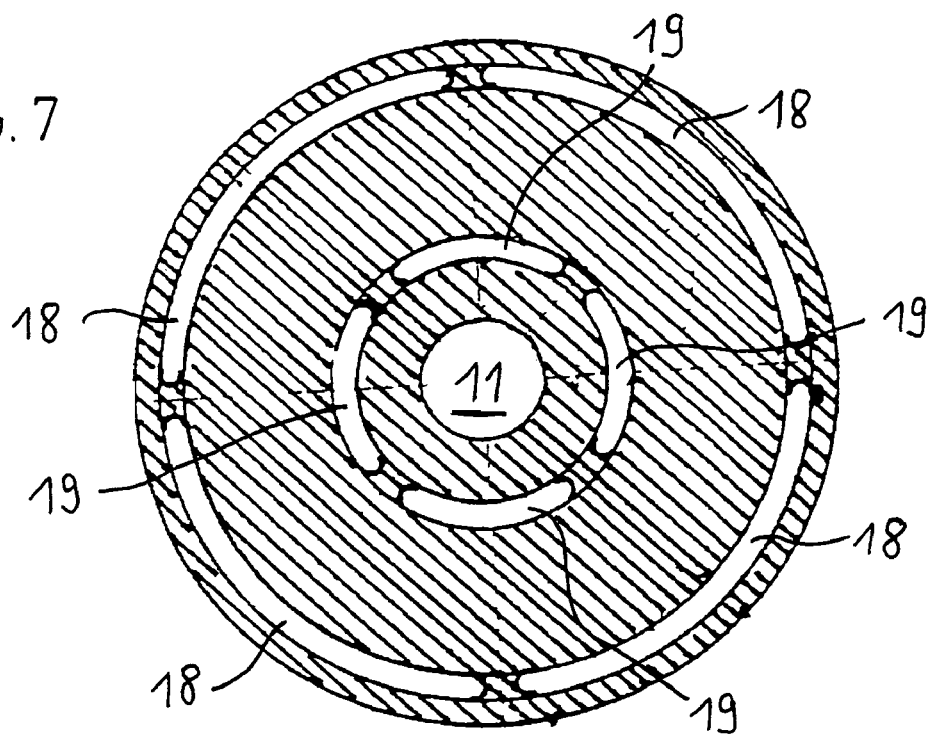
FIG. 7 is a cross-sectional view of the device of FIG. 1 along line F—F.

FIG. 7 depicts four internal branches 18 of the recirculation path, four internal branches 19 of the hydrogen gas exit path and the recirculation exit port 11.

Figure 8:
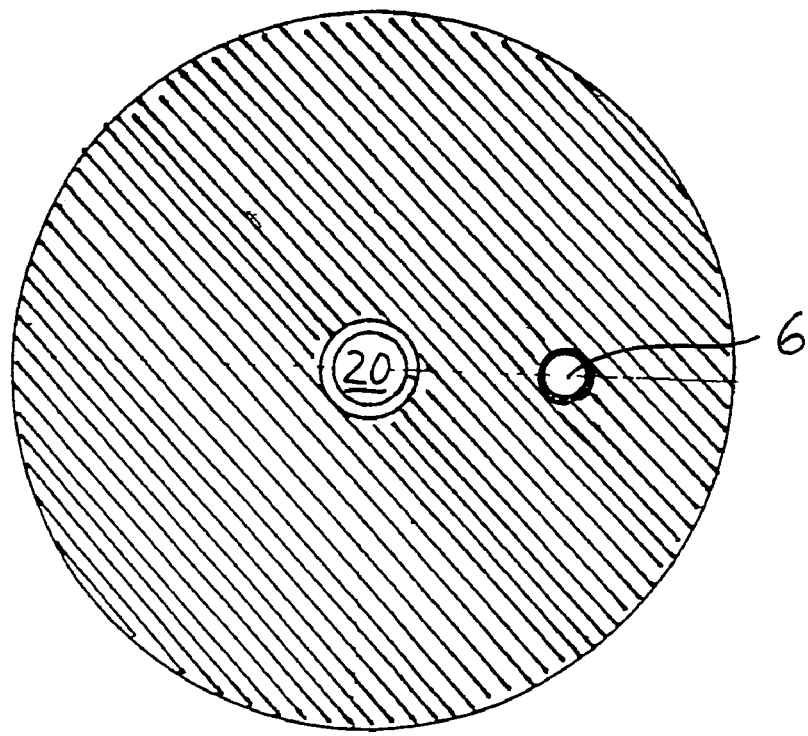
FIG. 8 is a cross-sectional view of the device of FIG. 1 along line G—G.

FIG. 8 depicts the hydrogen gas exit port 20 and the water inlet port 6.

Figure 9:
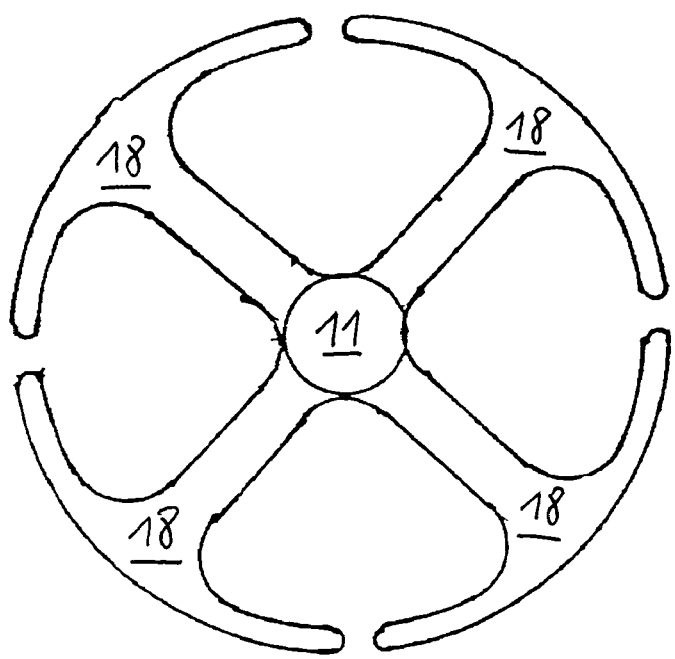
FIG. 9 is an schematic illustration of a part of a recirculation path.

FIG. 9 depicts an schematic illustration of the four internal branches 18 of the recirculation path in the lower part of the device, which are also depicted in FIG. 7. The four internal branches 18 are combined at the recirculation port 11.

Figure 10:
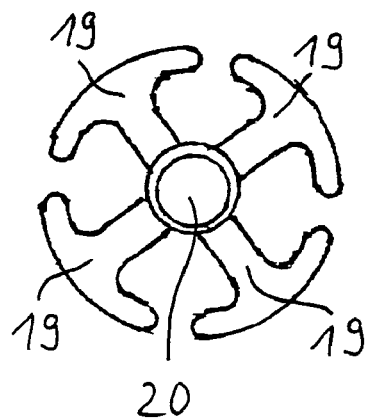
FIG. 10 is an schematic illustration of an exit path for carrying off hydrogen gas from the device according to the invention.

FIG. 10 depicts an schematic illustration of the four internal branches 19 of the hydrogen gas exit path in the lower part of the device, which are also depicted in FIG. 7. The four internal branches 19 are combined at the hydrogen gas exit port 20.

Since the generated hydrogen gas exits the oxidization chamber 2 at extremely high temperatures there is a requirement for an after cooler stage that can be utilized to pre-heat input water and provide external heating of a facility or a hot water storage unit. The after cooler heat rejection can also be used to thermally charge zeolite energy storage modules.

To produce atomic hydrogen gas the output gas is treated with magnetic fields to spin synchronize and stabilize as the gas is cooled. Normal cooling of the output gas will result in the hydrogen assuming its natural state molecular bonding to form $H_2$-gas. A test of flame temperatures upon burning the output gas with pure oxygen determines the presence of atomic hydrogen. Atomic hydrogen produces a flame temperature above 6000° C.

From the above description of a preferred embodiment it will become apparent that the exothermic process and the device according to the invention have several unique features by which hydrogen gas as atomic hydrogen or as a molecular hydrogen can be produced in economical way. The first of these unique features is the employment of an extremely high spin rate implosion vortex in the oxidization chamber 2. The device requires a priming fuel to bring it up to a threshold temperature at which partial steam decomposition occurs. When partial decomposition starts then the hydrogen contribution helps to bootstrap the process up into the thermal region of 2100° C., where the reaction will self sustain as long as carbon and water are input into the oxidization chamber 2 in the proper stoichiometric ratio ($6C+12H_2O=6CO_2+24H$). The second unique feature is the recirculation of partially oxidized carbon particles and carbon monoxide gas into the oxidization chamber. The third unique feature is the steam vortex generator 7 with the omni nozzle 9 which produces the ultra high spin rate in the oxidization chamber 2. This ultra high spin rate provides the necessary separation of atomic hydrogen gas from the partially oxidized carbon and carbon dioxide gas produced. The fourth unique feature is the extreme thermal region of operation of the process, which provides the decomposition of steam into its oxygen and hydrogen gas components above 3000° C. at which temperature molecular hydrogen is broken into atomic hydrogen. The fifth unique feature is the densified ceramic construction of the entire device, which enables it to operate at temperatures never attempted in previous generator designs. The sixth unique feature is the concentric design of the device according to the invention, which places the steam generating chamber 5 in the most advantageous location to provide the dissociation of vapour state water. The seventh unique feature is the utilization of an implosion vortex, which causes the physical separation of dissimilar gases by molecular weight. This feature allows the separated carbon dioxide to exit the oxidization chamber 2 from outlet port 15 located at the core of the vortex. The lighter weight hydrogen exits the oxidization chamber 2 at the outer layer of the vortex flow at the opposite end of the oxidization chamber 2. Based on the principle of operation of an implosion vortex the core gas, i.e. the carbon dioxide gas, will exit the oxidization chamber 2 at a reduced temperature. The outer layer gas, i.e. the hydrogen gas, will gain temperature and exit the oxidization chamber at the annular port 14. The eighth unique feature is the utilization of an electrostatic arc across the spinning gas plasma in the vortex from the electrodes 16 to the tungsten ring 17.

The present invention is not restricted to the embodiment described above. Rather, a number of variants can be conceived, which, even with basically deviating designs, make use of the invention defined in the claims. It is conceivable in particular, for example, that the separation of carbon dioxide gas from hydrogen gas generated in the above described device is performed in a secondary stage as an external process to the process for generating the hydrogen gas form water and powdered carbon. This would require the device shown in FIGS. 1 to 10 to operate at sufficient pressure to provide high velocity tangential input to a external separator. With an external gas separation stage the carbon dioxide exit port 15 would be eliminated and combined hydrogen/carbon dioxide gases would exit the oxidization chamber 2 at annular port 14 and out through collector port 20 to the external separator stage.

The invention claimed is:

1. Process for producing hydrogen gas from water and carbon, comprising:
    powdered carbon in stoichiometric ratio of carbon to water into a preheated oxidization chamber (2) in such a way that a gas plasma is produced in which the steam is decomposed into its hydrogen and oxygen gas components and oxygen is combined with carbon to form carbon dioxide gas in an exothermic reaction at temperature above 2000° C.,
    recirculating of partially oxidized carbon particles and/or carbon monoxide gas into the gas plasma,
    separating the carbon dioxide gas from the hydrogen gas, wherein the separation of the generated hydrogen gas from other gas components is caused by the gas plasma
forming an implosion vortex having a high spin rate,
carrying off the generated hydrogen gas from the oxidization chamber via a first exit port (14), and
carrying off the generated carbon dioxide gas from the oxidization chamber via a second exit port (15).

2. The process according to claim 1, further comprising preheating the oxidization chamber (2) by introducing a fuel gas into the oxidization chamber (2).

3. The process according to claim 1, further comprising
using an electrostatic arc across the gas plasma in order to fill valence electrons into the gas plasma constituents.

4. The process according to claim 1, further comprising
cooling the generated hydrogen gas in a heat exchanger, and using the heat carried off in the heat exchanger for the preheating of water which is transformed into steam.

5. The process according to claim 1,
wherein the generated hydrogen gas is treated with magnetic fields to spin synchronize and stabilize as the hydrogen gas is cooled.

* * * * *